(12) United States Patent
Schiek

(10) Patent No.: US 9,227,502 B2
(45) Date of Patent: Jan. 5, 2016

(54) MODULAR SYSTEM

(75) Inventor: Werner Schiek, Jettingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/882,752

(22) PCT Filed: Dec. 1, 2011

(86) PCT No.: PCT/EP2011/006017
§ 371 (c)(1),
(2), (4) Date: May 1, 2013

(87) PCT Pub. No.: WO2012/076129
PCT Pub. Date: Jun. 14, 2012

(65) Prior Publication Data
US 2013/0239750 A1    Sep. 19, 2013

(30) Foreign Application Priority Data

Dec. 7, 2010    (DE) .......................... 10 2010 061 062

(51) Int. Cl.
| | |
|---|---|
| *F16H 37/06* | (2006.01) |
| *B60K 6/40* | (2007.10) |
| *B60K 6/48* | (2007.10) |
| *B60K 6/485* | (2007.10) |

(52) U.S. Cl.
CPC ... *B60K 6/40* (2013.01); *B60K 6/48* (2013.01); *B60K 6/485* (2013.01); *Y02T 10/6221* (2013.01); *Y10S 903/902* (2013.01); *Y10T 74/19056* (2015.01)

(58) Field of Classification Search
USPC ............ 74/661, 665 A, 665 B, 665 D, 665 E, 74/665 F, 665 G
See application file for complete search history.

(56) References Cited

U.S. PATENT DOCUMENTS

| | | | | |
|---|---|---|---|---|
| 5,755,302 | A  * | 5/1998 | Lutz et al. ................. | 180/65.21 |
| 6,340,339 | B1 * | 1/2002 | Tabata et al. ...................... | 475/5 |
| 6,668,953 | B1 * | 12/2003 | Reik et al. .................... | 180/53.8 |

(Continued)

FOREIGN PATENT DOCUMENTS

| | | |
|---|---|---|
| DE | 199 51 575 | 5/2001 |
| DE | 101 09 093 | 9/2002 |

(Continued)

OTHER PUBLICATIONS

International Search Report of Apr. 25, 2012.

(Continued)

*Primary Examiner* — Ha D Ho
(74) *Attorney, Agent, or Firm* — Gerald E. Hespos; Michael J. Porco; Matthew T. Hespos

(57) ABSTRACT

The present invention relates to a modular system of a drivetrain of a motor vehicle, having an internal combustion engine (3) which has a dual-mass flywheel (5) with a hub (4), having a transmission (8) and having a hybrid module (10) which has an electric motor (9), wherein the transmission (8) has a transmission input shaft (6) and the hybrid module (10) has a hybrid module input shaft (7), wherein the transmission (8) or the hybrid module (10) can be connected alternatively with its respective input shaft (6, 7) to the hub (4) of the dual-mass flywheel (5). Particularly flexible production is made possible in this way.

10 Claims, 1 Drawing Sheet

(56) References Cited

U.S. PATENT DOCUMENTS

| | | | |
|---|---|---|---|
| 6,720,696 B2* | 4/2004 | Berhan | 310/113 |
| 7,033,296 B2* | 4/2006 | Takenaka | 475/5 |
| 8,206,252 B2* | 6/2012 | Dusenberry et al. | 475/5 |
| 8,585,541 B2 | 11/2013 | Mueller | |
| 2007/0161455 A1 | 7/2007 | King et al. | |
| 2008/0015085 A1* | 1/2008 | Chapelon et al. | 477/6 |
| 2008/0060859 A1 | 3/2008 | Klemen et al. | |
| 2008/0264706 A1* | 10/2008 | Andersson | 180/65.6 |
| 2009/0223725 A1* | 9/2009 | Rodriguez et al. | 180/65.21 |
| 2009/0283344 A1 | 11/2009 | Arnold et al. | |
| 2011/0154944 A1 | 6/2011 | Mueller | |
| 2013/0239750 A1* | 9/2013 | Schiek | 74/665 B |

FOREIGN PATENT DOCUMENTS

| | | | | |
|---|---|---|---|---|
| DE | 10 2008 006 062 | 2/2009 | | |
| DE | 10 2007 045 443 | 4/2009 | | |
| DE | 102007045443 A1 * | 4/2009 | | F16F 15/131 |
| DE | 10 2009 020 672 | 12/2009 | | |
| JP | 2004136743 | 5/2004 | | |
| JP | 2009143478 | 7/2009 | | |
| WO | 2004/053350 | 6/2004 | | |
| WO | 2010/007126 | 1/2010 | | |
| WO | WO 2010007126 A1 * | 1/2010 | | |
| WO | WO 2009146670 A3 * | 2/2010 | | |

OTHER PUBLICATIONS

German Search Report of Dec. 7, 2011.

* cited by examiner

MODULAR SYSTEM

BACKGROUND OF THE INVENTION

1. Field of the Invention

The present invention relates to a modular system of a drive train of a motor vehicle.

2. Description of the Related Art

In order for it to be possible to influence the emissions behavior of motor vehicles positively, more and more hybrid vehicles are coming onto the market, which not only make a drive purely by internal combustion engine possible, but rather also make a drive by electric motor possible in addition or as an alternative. However, the equipping of an otherwise identical motor vehicle as a hybrid vehicle requires not inconsiderable adaptations in the production process, which adaptations, in particular, make smooth and flexible series production difficult. The use of what are known as hybrid modules which are installed in otherwise structurally identical motor vehicles, if the latter are to be equipped as a hybrid vehicle, also requires considerable outlay and a considerable intrusion into the production routine.

WO 2010/007126 A1, for example, has disclosed a drive train of a hybrid vehicle, which drive train comprises an internal combustion engine with a drive shaft, an electric machine which can be operated as motor and as generator, and a multiple-stage epicyclic gear. Here, the drive shaft of the internal combustion engine can be set via a controllable separating clutch and the rotor of the electric machine can be set via an input transmission stage in a drive connection with the input shaft of the automatic transmission. Here, both the electric machine and the separating clutch and the input transmission stage are combined in a coaxial arrangement in a hybrid module which can be preassembled with a module housing, an input element and an output element, the input element being connected fixedly to the drive shaft of the internal combustion engine so as to rotate with it and the output element being connected fixedly to the input shaft of the automatic transmission so as to rotate with it. Moreover, the hybrid module has the dimensions of a hydrodynamic torque converter which can be used conventionally.

The present invention is concerned with the problem of specifying a modular system for a drive train of a motor vehicle, which modular system makes a flexible construction of a conventional drive train and of a hybrid drive train possible.

SUMMARY OF THE INVENTION

The present invention is based on the general concept of specifying a modular system, by means of which a conventional drive train or a hybrid drive train can be alternatively built without substantial modifications. To this end, according to the invention, the modular system has an internal combustion engine which has a two-mass flywheel which has a hub. Moreover, the modular system comprises a transmission and a hybrid module which has an electric motor, the transmission having a transmission input shaft and the hybrid module having a hybrid-module input shaft. In the modular system according to the invention, the two-mass flywheel represents a standardized shaft/hub connection, the hub being arranged on the crankshaft side and it being possible to connect it without any modification to the associated, standardized transmission input shaft or to the hybrid-module input shaft. On account of the standardized shaft/hub connection on the two-mass flywheel, the modular system according to the invention therefore makes the construction possible of a conventional drive train, that is to say operated by internal combustion engine, or of a hybrid drive train, without structural adaptations being required for this purpose. A conventional motor vehicle or a hybrid vehicle can therefore be produced flexibly by way of the modular system according to the invention, without disruptive intrusions having to be made to the production routine for this purpose. In particular, the production of hybrid vehicles can be integrated in a considerably improved manner into the series production of vehicles which are driven purely by internal combustion engine.

In one advantageous development of the solution according to the invention, the hybrid-module input shaft can be connected to a rotor of the electric motor via a clutch. When the clutch is closed, the drive of the drive train is therefore ensured via the internal combustion engine, it being possible for the electric motor to be operated as a generator when said electric motor has its current switched off, with the result that a vehicle battery can be charged by means of the internal combustion engine. When the clutch is open, in contrast, driving of the hybrid vehicle purely by electric motor is possible, as is likewise charging of the vehicle battery, if the hybrid vehicle is driving downhill, for example, and the electric motor is used as a generator in this state.

In a further advantageous embodiment of the solution according to the invention, the transmission is configured as what is known as a dual clutch transmission. Dual clutch transmissions are automated change-speed transmissions which make a fully automatic gear change possible by means of two component transmissions without an interruption in traction power and therefore virtually without a jolt. Here, the transmission controller can select the gears either independently or according to a driver request within the scope of permissible rotational speed ranges. In contrast with automatic transmissions with a hydraulic torque converter, the transmission of the torque takes place via one of two clutches which connect two component transmissions to the drive. A gear change without an interruption in traction power is conceivable by a clutch closing here at the same time as the other opens. As a result of the standardized configuration of the hybrid-module input shaft as well as the transmission input shaft, the hybrid module with a connected transmission can be drive-connected or merely a transmission of this type alone can be drive-connected to the hub of the internal combustion engine, as desired and without any other modifications.

Further important features and advantages of the invention result from the subclaims, from the drawings and from the associated description of the figures using the drawings.

It goes without saying that the features which are mentioned in the preceding text and are still to be explained in the following text can be used not only in the respectively specified combination, but also in other combinations or on their own, without departing from the scope of the present invention.

Preferred exemplary embodiments of the invention are shown in the drawings and will be explained in greater detail in the following description, identical designations relating to identical or similar or functionally identical components.

DETAILED DESCRIPTION OF THE PREFERRED EMBODIMENTS

Figure 1:
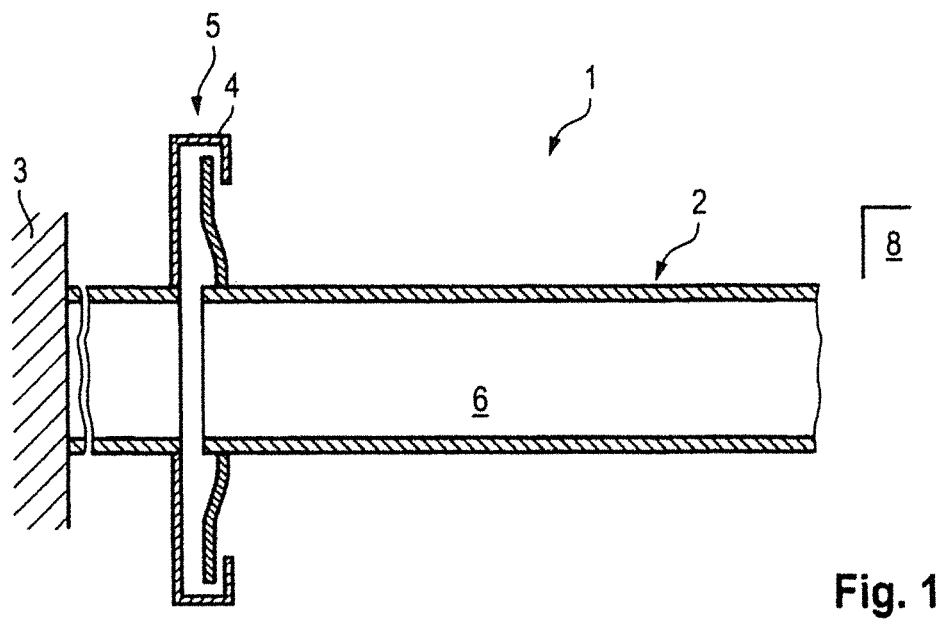
FIG. 1 shows a modular system according to the invention having a transmission.
Figure 2:
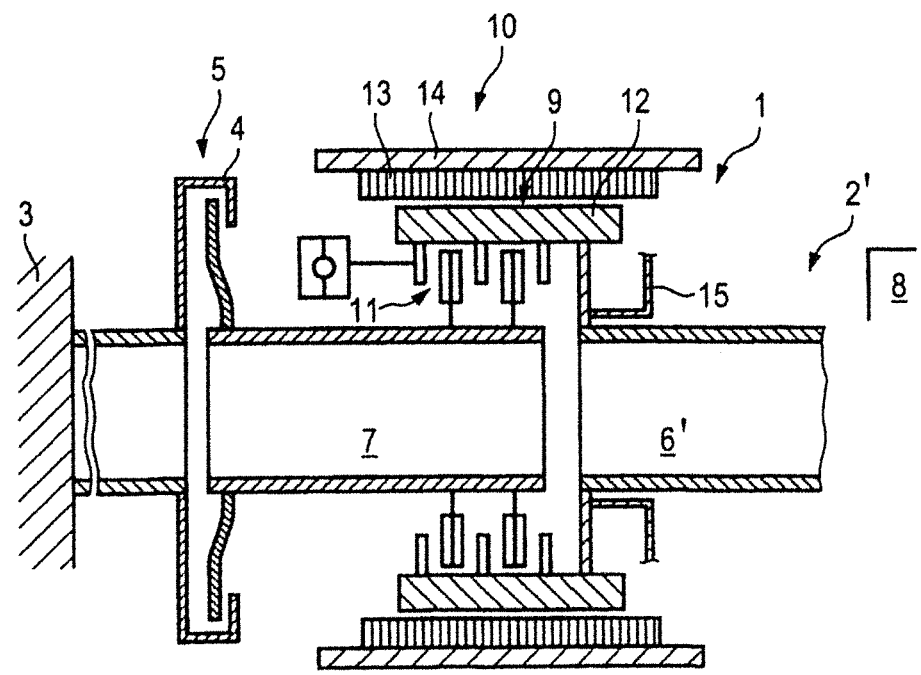
FIG. 2 shows an illustration as in FIG. 1, a hybrid module being provided with a following transmission, however.

According to FIGS. 1 and 2, a modular system 1 according to the invention of a drive train 2, 2' of a motor vehicle (which is otherwise not shown) has an internal combustion engine 3, a two-mass flywheel 5 with a hub 4, and a transmission 8. Here, the two-mass flywheel 5 has a standardized shaft/hub connection, with the standardized crankshaft-side hub 4. The version of the modular system 1 shown in FIG. 1 has an associated standardized transmission input shaft 6 extending from the standardized hub 4 to the transmission 8. The version of the modular system 1 shown in FIG. 2 has a hybrid-module input shaft 7 extending from the standardized crankshaft-side hub 4 to a hybrid module 10. A shorter version of the transmission input shaft 6' then extends from the hybrid module 10 to the transmission 8 (cf. FIGS. 1 and 2). The hybrid module 10 of the version of the modular system 1 shown in FIG. 2 has an electric motor 9. The version of the modular system 1 shown in FIG. 1 has the transmission input shaft 6 extending from the standardized crankshaft-side hub 4 to the transmission 8, whereas the version of the modular system 1 shown in FIG. 2 has the hybrid module 10, the hybrid-module input shaft 7 and the shorter version of the transmission input shaft 6' that extends from the hybrid module 10 to the transmission 8. In order then for it to be possible to flexibly produce both a conventional motor vehicle (FIG. 1), that is to say driven purely by internal combustion engine, and a hybrid vehicle (FIG. 2), the transmission 8 (FIGS. 1 and 2) can alternatively be connected to the internal combustion engine 3 (FIGS. 1 and 2) via the standardized crankshaft-side hub 4 of the two-mass flywheel 5 (FIGS. 1 and 2) either directly by the transmission input shaft 6 (FIG. 1) or by the shorter transmission shaft 6', the hybrid module 10 and the hybrid-module input shaft 7 (FIG. 2). As a result of the standardized shaft/hub connection of the two-mass flywheel 5, the hub 4 thereof can therefore be drive-connected in a freely selectable and therefore completely flexible manner to the transmission input shaft 6 (FIG. 1) or the hybrid-module input shaft 7 (FIG. 2), as a result of which no structural adaptations at all are required to the internal combustion engine 3 and the transmission 8 (FIGS. 1 and 2) to realize a conventional vehicle (FIG. 1) or a hybrid vehicle (FIG. 2).

Here, the two-mass flywheel 5 serves primarily to reduce torsional vibrations, the conventional flywheel mass being divided into a primary flywheel mass and a secondary flywheel mass which are arranged on the internal combustion engine 3 and on the transmission input shaft 6 or the hybrid-module input shaft 7.

If FIG. 2 is considered, it can be seen that the hybrid-module input shaft 7 is connected to a rotor 12 of the electric motor 9 via a clutch 11. Here, an associated stator 13 of the electric motor 9 is arranged in a housing 14 of the hybrid module 10. Here, the rotor 12 of the electric motor 9 is connected fixedly to a or the transmission input shaft 6, it being possible for the rotor 12 to have an attaching element 15 at the same time for attachment to an automatic converter (not shown). Moreover, the transmission 8 can be configured, for example, as a dual clutch transmission and, as a result, can make shifting possible which has particularly small jolts or is jolt-free.

It is therefore possible by way of the modular system 1 according to the invention for the drive train to always be of identical configuration in relation to the internal combustion engine 3 and the hub 4 of the two-mass flywheel 5, it being possible alternatively for the transmission input shaft 6 or the hybrid-module input shaft 7 to be attached to the hub 4 of the two-mass flywheel 5 which is standardized in this way, in order to produce a conventional motor vehicle or a hybrid vehicle. Further structural modifications are not required.

The invention claimed is:

1. A plurality of drive trains for motor vehicles, the drive trains comprising identical internal combustion engines with identical two-mass flywheels that have identical hubs, and identical transmissions spaced from the respective internal combustion engines, the plurality of drive trains including:
   at least one first drive train with a first transmission input shaft having a first output end connected directly to the transmission of the first drive train and a first input end having a first hub connection connected directly to the hub of the two-mass flywheel of the internal combustion engine of the first drive train; and
   at least one second drive train with a second transmission input shaft having a second output end connected directly to the transmission of the second drive train and a second input end, a hybrid module with an electric motor, the hybrid module having an output end connected to the second input end of the second transmission input shaft and a hybrid-module input shaft with a second hub connection substantially identical to the first hub connection, the second hub connection being connected to the hub of the two-mass flywheel of the internal combustion engine of the second drive train.

2. The plurality of drive trains of claim 1, wherein the hybrid-module input shaft is configured to be connected to a rotor of the electric motor via a clutch.

3. The plurality of drive trains of claim 2, wherein the rotor of the electric motor is configured to be connected to the input end of the second transmission input shaft.

4. The plurality of drive trains of claim 2, wherein a stator of the electric motor is arranged in a housing of the hybrid module.

5. The modular system of claim 2, wherein the rotor has an attaching element for attachment to an automatic converter.

6. The modular system of claim 1, wherein the transmission is a dual clutch transmission.

7. A plurality of drive trains for motor vehicles, comprising:
   a plurality of identical internal combustion engines, the internal combustion engines having identical two-mass flywheels that have identical hubs
   a plurality of identical transmissions;
   at least one transmission input shaft having an output end connected directly to one of the identical transmissions and an input end with a hub connection connected directly to the hub of the two-mass flywheel of one of the internal combustion engines; and
   at least one hybrid module with an electric motor, the hybrid module having a hybrid module output shaft connected to one of the identical transmissions and a hybrid-module input shaft with a hub connection connected to the hub of the two-mass flywheel of one of the identical internal combustion engines, wherein the hub connection of the hybrid-module input shaft is substantially identical to the hub connection of the transmission input shaft.

8. The plurality of drive trains of claim 7, wherein the electric motor has a rotor and the hybrid-module input shaft is connected to the rotor of the electric motor via a clutch.

9. The plurality of drive trains of claim 8, wherein the rotor of the electric motor is configured to be connected to the transmission input shaft.

10. The plurality of drive trains of claim 8, wherein of the hybrid module has a housing, and the electric motor of the hybrid module has a stator arranged in the housing of the hybrid module.

* * * * *